United States Patent
Iwata

[11] Patent Number: 6,101,441
[45] Date of Patent: Aug. 8, 2000

[54] DRIVE FORCE CONTROLLER FOR A VEHICLE

[75] Inventor: Toru Iwata, Yokohama, Japan

[73] Assignee: Nissan Motor Co., Ltd., Yokohama, Japan

[21] Appl. No.: 09/099,526

[22] Filed: Jun. 18, 1998

[30] Foreign Application Priority Data

Jun. 20, 1997 [JP] Japan ................................. 9-164040

[51] Int. Cl.⁷ ................................................. F02D 41/04
[52] U.S. Cl. ............................ 701/84; 701/90; 701/104; 180/197
[58] Field of Search ..................... 701/84, 86, 90–104; 180/197; 303/139, 143, 145

[56] References Cited

U.S. PATENT DOCUMENTS

| | | | |
|---|---|---|---|
| 5,785,031 | 7/1998 | Akimoto et al. | 123/295 |
| 5,829,544 | 11/1998 | Ishizu | 180/197 |

FOREIGN PATENT DOCUMENTS

| | | |
|---|---|---|
| 3-67042 | 3/1991 | Japan . |
| 8-144803 | 6/1996 | Japan . |

Primary Examiner—Tan Nguyen
Attorney, Agent, or Firm—Foley & Lardner

[57] ABSTRACT

An engine for a vehicle which selectively performs uniform combustion wherein an air-fuel mixture uniformly spread in the combustion chamber is burnt and stratified combustion wherein an air-fuel mixture converged to a part of the combustion chamber is burnt, is combined with a drive force controller for suppressing a slip of a vehicle drive wheel by reducing the engine output. At the end of drive force reduction control, it is determined whether the engine is in the stratified combustion condition or the uniform combustion condition. When it is in the stratified combustion condition, uniform combustion is first performed for a predetermined time, and then stratified combustion is performed. In this way, the combustion is prevented from becoming instable when the drive force reduction control is terminated.

8 Claims, 4 Drawing Sheets

DRIVE FORCE CONTROLLER FOR A VEHICLE

The contents of Tokugan Hei 9-164040, with a filing date of Jun. 20, 1997 in Japan, are hereby incorporated by reference.

FIELD OF THE INVENTION

This invention relates to a combination of a vehicle drive force controller for adjusting wheel drive force according to a slip state of drive wheels, and a lean burn vehicle engine which performs stratified combustion.

BACKGROUND OF THE INVENTION

Tokkai Hei 3-67042 published by the Japanese Patent Office in 1991 and Tokkai Hei 8-144803 published by the Japanese Patent Office in 1996 indicate a "traction controller" in which a slip of vehicle drive wheels is suppressed by lowering the vehicle wheel drive force.

The slip of drive wheels may occur due to the state of a road surface during vehicle acceleration, and this device suppresses the slip by reducing the output torque of the engine according to a wheel slip factor.

Reduction of the output torque is performed for example by cutting fuel supply to some of the cylinders of the engine.

When an engine which performs stratified combustion is combined with such a drive force controller, however, the following problem arises. Stratified combustion refers to combustion where fuel is injected directly into the cylinder in the latter half of a compression stroke of a piston in the cylinder, and a combustible air-fuel mixture layer is formed around the spark plug. In this type of combustion, stable combustion can be performed while keeping the air-fuel ratio extremely lean in the whole combustion chamber. The stratified combustion is generally performed in the low load region of the engine where high engine output is not required. In the high load region where high engine output is required, fuel injection is performed in the intake stroke, and uniform combustion of a homogeneous air-fuel mixture is performed in the vicinity of the stoichiometric air-fuel ratio.

Therefore it is in the running region where the required engine output torque is comparatively small that the engine performs stratified combustion.

Even in this case, when road surface friction is low, e.g. when the road surface freezes, the traction controller cuts the fuel supply to a specific cylinder or cylinders. Slip is thereby suppressed, and fuel supply to all cylinders is resumed again when ordinary running conditions have returned.

However, if the temperature of the combustion chamber falls due to cutting of the fuel supply, there is a risk that stratified combustion will not become stable just after the recovery of fuel supply and misfiring may occur in the combustion chamber.

Even when drive force reduction control is performed by retarding the ignition timing, reducing the throttle opening or reducing the supercharging pressure in a supercharging engine, stratified combustion may also not become stable when it is performed immediately after the termination of the drive force reduction control.

SUMMARY OF THE INVENTION

It is therefore an object of this invention to prevent the aforesaid adverse effect of engine output reduction on stratified combustion.

In order to achieve the above object, this invention provides a drive force controller for a vehicle. The vehicle is provided with a drive wheel and an engine for driving the drive wheel, and the engine comprises a combustion chamber for burning air-fuel mixture.

The controller comprises a sensor for detecting a slip of the drive wheel, a sensor for detecting a running condition of the engine, and a microprocessor programmed to control the engine to cause reduction of an engine output according to the slip, control the engine to selectively perform uniform combustion wherein an air-fuel mixture uniformly spread in the combustion chamber is burnt and stratified combustion wherein an air-fuel mixture converged to a part of the combustion chamber is burnt, according to the running condition, and prevent the engine from performing stratified combustion for a predetermined time after the reduction of the engine output has terminated.

It is preferable that the microprocessor is further programmed to control the engine to perform the uniform combustion while the output of the engine is being reduced.

It is also preferable that the running condition detecting sensor comprises a sensor for detecting a load of the engine, and the microprocessor is further programmed to shorten the predetermined time the larger the load.

It is also preferable that the running condition detecting sensor comprises a sensor for detecting a rotation speed of the engine, and the microprocessor is further programmed to shorten the predetermined time the higher the rotation speed.

It is also preferable that the running condition detecting sensor comprises a sensor for detecting a temperature of the engine, and the microprocessor is further programmed to shorten the predetermined time the lower the temperature.

In this case, it is further preferable that the microprocessor is further programmed to set the predetermined time to infinity when the temperature is lower than a predetermined temperature.

It is also preferable that the microprocessor is further programmed to set a recovery timer value when the slip detecting sensor has detected the slip of the drive wheel, start to reduce the recovery timer value when the slip detecting sensor has come to detects no slip of the drive wheel and determine that the predetermined time has elapsed when the recovery timer value becomes zero.

The details as well as other features and advantages of this invention are set forth in the remainder of the specification and are shown in the accompanying drawings.

DESCRIPTION OF THE PREFERRED EMBODIMENTS

Figure 1:
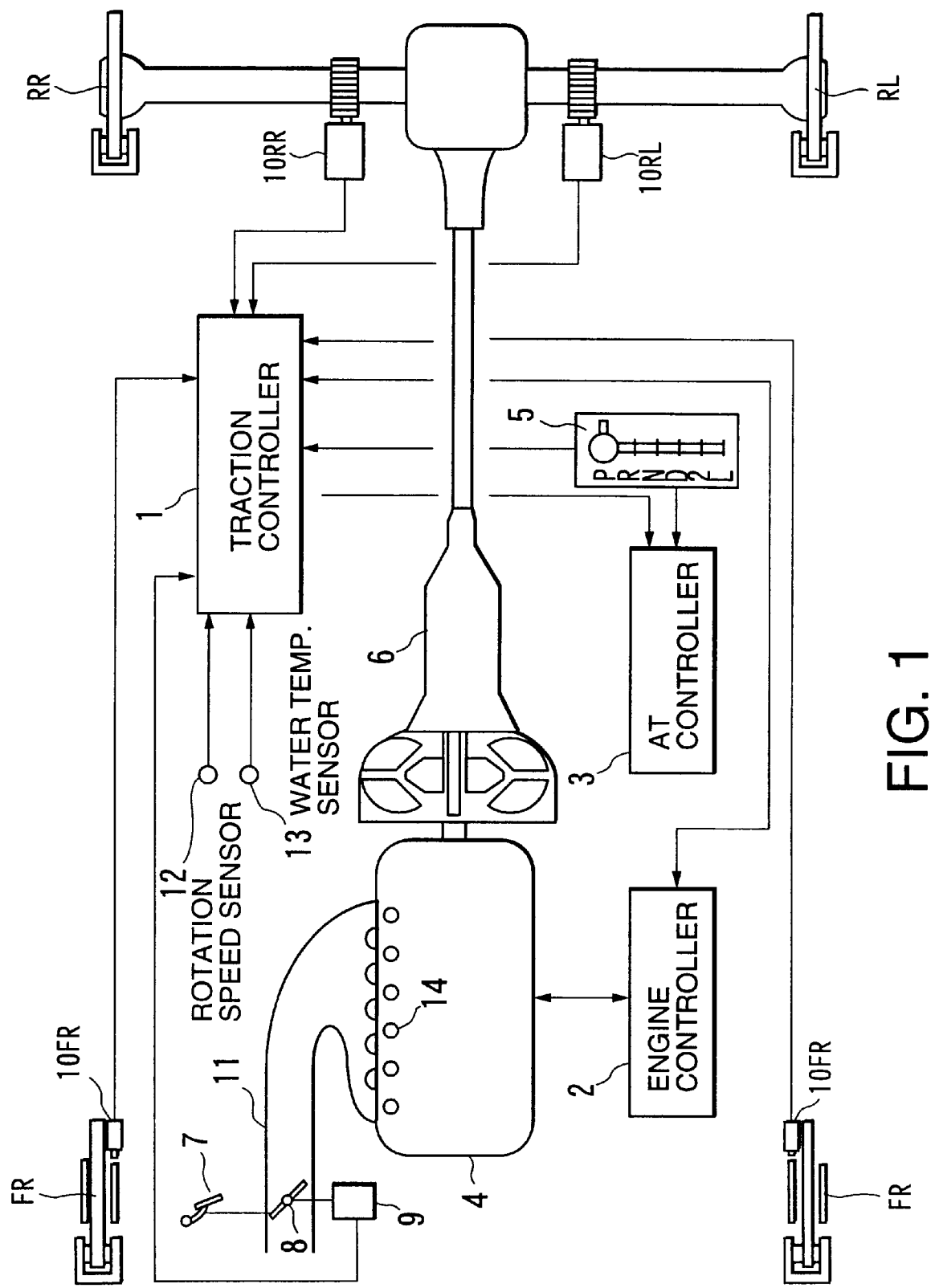
FIG. 1 is a schematic diagram of a drive force controller according to this invention.

Referring to FIG. 1 of the drawings, in a multi-cylinder engine 4 which performs stratified combustion, fuel is injected from a fuel injection valve 14 directly into a combustion chamber of each cylinder, and a spark plug, not shown, ignites a mixture of this fuel with air aspirated from an intake passage 11 so that the air-fuel mixture burns.

The fuel injection timing and a fuel injection amount of the engine 4 are controlled by an engine controller 2 comprising a microcomputer.

In the partial load region of the engine 4, the engine controller 2 sets the fuel injection timing in the latter half of the compression stroke of each cylinder, a combustible air-fuel mixture layer is formed in the vicinity of the spark plug, and the engine 4 performs stratified combustion using a lean air-fuel mixture. On the other hand, in the high load region of the engine 4, the fuel injection timing is set in the first half of the intake stroke of each cylinder, and the engine 4 performs uniform combustion using a uniform air-fuel mixture in the vicinity of the stoichiometric air-fuel ratio.

Based on a control signal from a traction controller 1, the engine controller 2 performs the reduction control of the engine output force by, for example, cutting fuel injection in some cylinders, reducing the opening of the intake throttle 8, or retarding the ignition timing of the spark plug. When the engine 4 is provided with a supercharger, drive force reduction can also be performed by reducing the supercharging pressure of the supercharger.

Signals are input into the traction controller 1 from a throttle sensor 9 for detecting an opening of the intake throttle 8 which varies according to the depression of an accelerator pedal 7, a rotation speed sensor 12 for detecting engine rotation speed, and a water temperature sensor 13 for detecting the cooling water temperature of the engine respectively.

Signals from wheel speed sensors 10RR, 10RL for detecting the rotation speed of rear wheels RR, RL which the engine 4 drives via an automatic transmission 6, and from wheel speed sensors detecting the rotation speed of front wheels FR, FL, are also input into the traction controller 1.

The traction controller 1, based on a velocity ratio between the rear wheels and the front wheels, calculates the slip factor of the rear wheels, and a drive force reduction signal according to the slip factor is output to the engine controller 2 when the slip factor exceeds a predetermined value. When the slip factor falls to a predetermined value or less, drive force reduction control is terminated, and a recovery signal is output to the engine controller 2. At the same time, it is determined whether to perform stratified combustion or uniform combustion from the running state of the engine 4 at that time, and a signal which commands the combustion state is output to the engine controller 2. However when it is determined to perform stratified combustion, it is not performed immediately, and a signal which commands stratified combustion to be performed after performing uniform combustion for a predetermined time is output to the engine controller 2.

The aforesaid automatic transmission 6 performs a speed change operation in response to a signal from an automatic controller (AT controller) 3. Specifically, a signal representing the running state of the engine 4 is input into the AT controller 3 from the traction controller 1. The AT controller 3 then controls the speed change ratio of the automatic transmission 6 according to this signal and the operating position of a shift lever 5 of the automatic transmission 6, based on a speed change characteristic corresponding to the running state of the engine 4.

Figure 2:
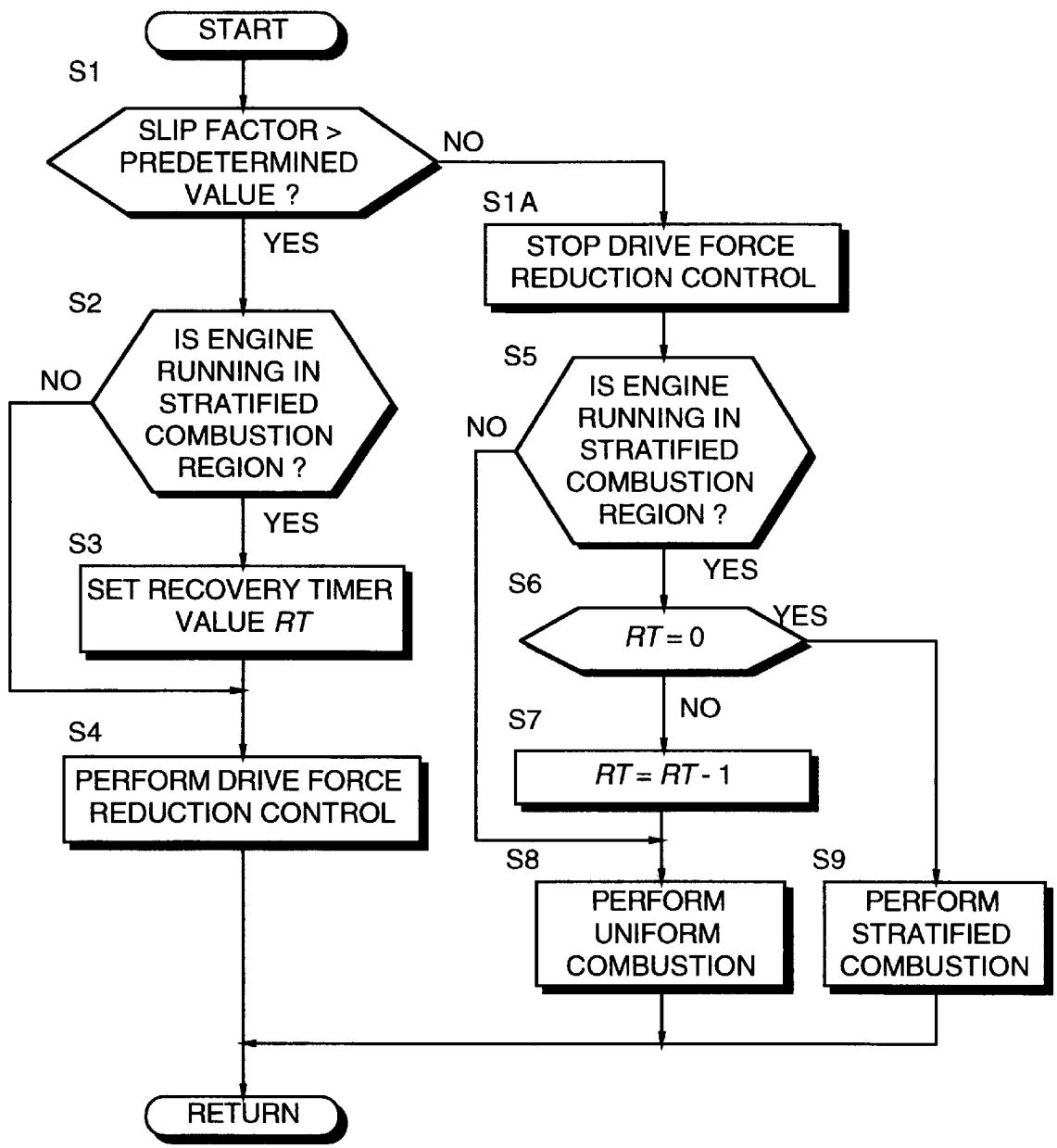
FIG. 2 is a flowchart for describing a drive force control process performed by the drive force controller.

The drive force reduction control process performed by the traction controller 1 will next be described referring to the flowchart of FIG. 2. This process is executed for example at a fixed interval.

In a step S1, based on the signals from the wheel speed sensors 10RR, 10RL and the signals from the wheel speed sensors 10FR, 10FL, the slip factor of the drive wheels RR, RL is calculated based on the ratio of the average speeds of the rear wheels RR, RL and front wheels FR, FL, and it is determined whether or not the slip factor is larger than a predetermined value. In other words, it is determined whether the rear wheels RR, RL are slipping.

When the rear wheels RR, RL are slipping, it is determined in a step S2 whether or not the running region of the engine 4 at that time is the stratified combustion region or the uniform combustion region.

Figure 3:
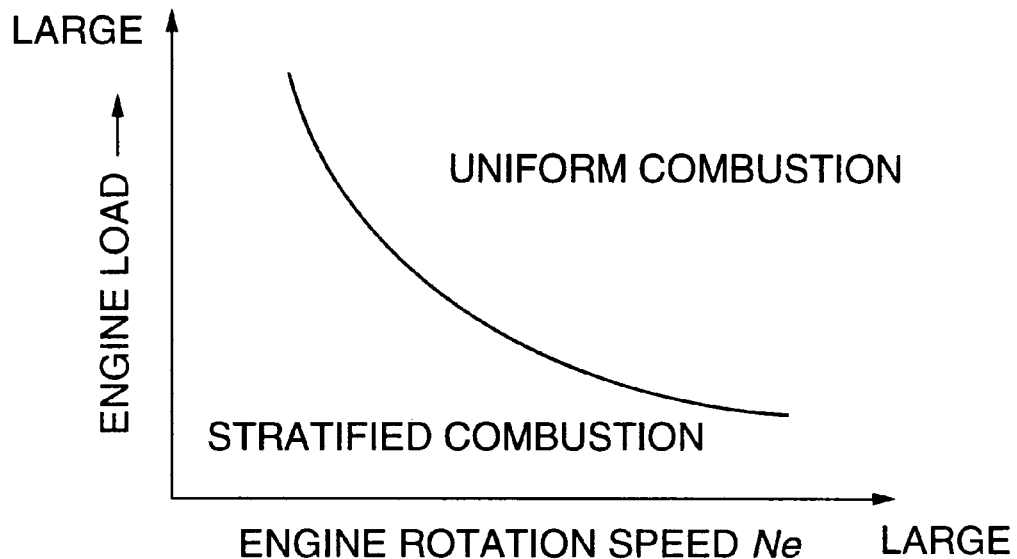
FIG. 3 is a diagram showing an engine running region for stratified combustion and that for uniform combustion divided according to an engine load and engine rotation speed.

As shown in FIG. 3, the stratified combustion region and uniform combustion region are set according to engine rotation speed and engine load. A map of this type is prestored in the traction controller 1, and the traction controller 1 determines the region based on the engine rotation speed Ne and engine load by referring to this map. The engine load is represented by the throttle opening detected by the throttle sensor 9.

When the current running state of the engine 4 is in the stratified combustion region, a recovery timer value RT is set in a step S3. The recovery timer value RT is a value expressing a waiting time until there is a shift to stratified combustion at the end of drive force reduction control.

Figure 4:
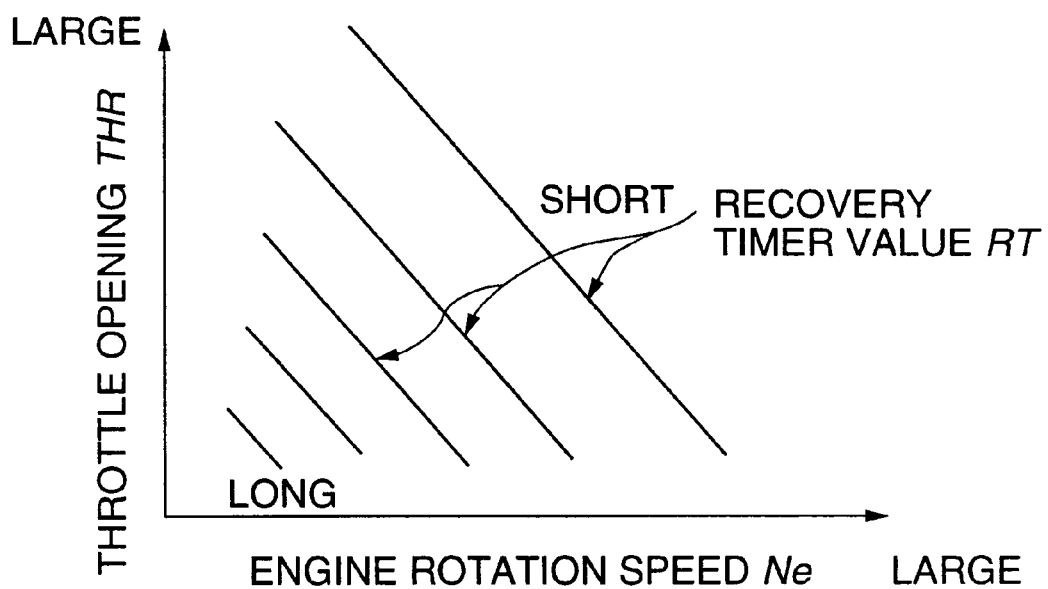
FIG. 4 is a diagram showing a characteristic of a recovery timer value set by the drive force controller.

The recovery timer value RT is set to a different value according to the running state of the engine 4, i.e. the throttle opening THR and engine rotation speed Ne. Specifically, the timer value RT is set longer the lower the speed and load when engine combustion tends to be unstable, and is set shorter the higher the speed and load. For this setting, a table of contents shown in FIG. 4 is prestored in the traction controller 1.

Figure 5:
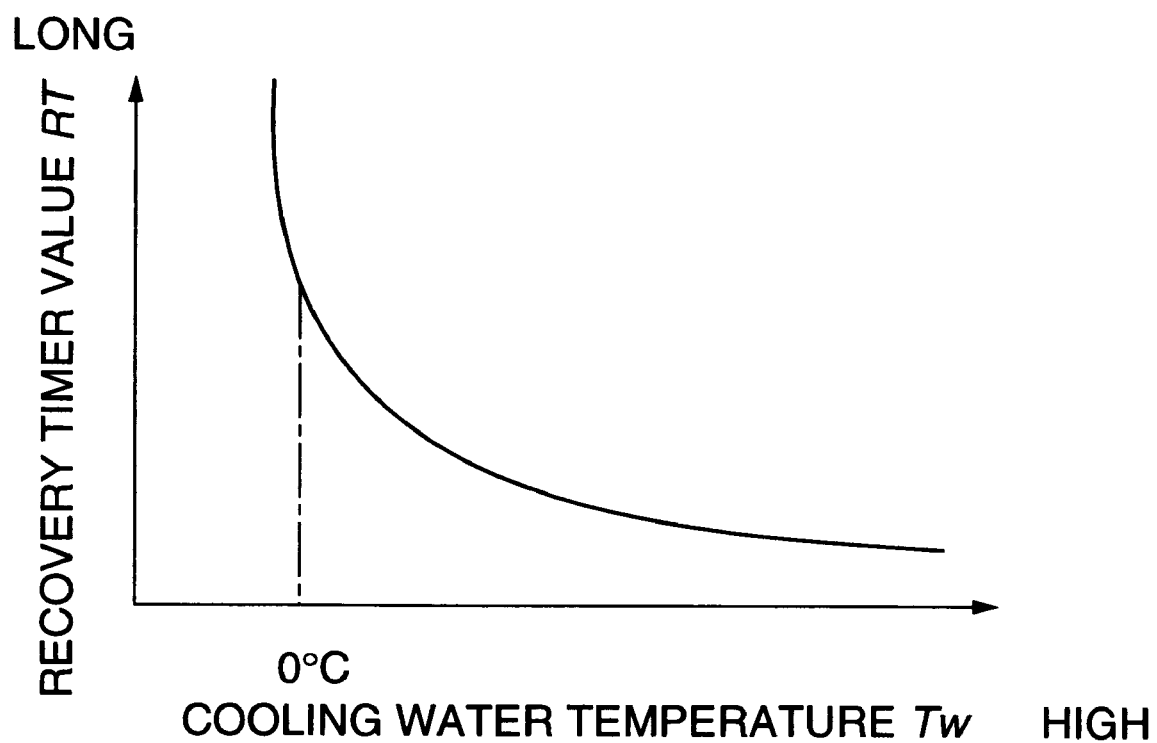
FIG. 5 is a diagram showing a characteristic of the recovery timer value according to another embodiment of this invention.

FIG. 5 shows a different embodiment concerning the setting of the recovery timer value RT.

Here, the recovery timer value is set according to a cooling water temperature Tw of the engine 4 detected by the water temperature sensor 13. Specifically, the timer value RT is set to be shorter the higher the cooling water temperature Tw. When the cooling water temperature Tw is equal to or less than a predetermined temperature, the recovery timer value RT is set to infinity so as not to return to stratified combustion.

After setting the recover timer value in this way in the step S3, the routine proceeds to a step S4. When it was determined that the engine 4 is in the uniform combustion region in the step S2, the routine jumps the step S3, and proceeds directly to the step S4.

In the step S4, drive force reduction control according to the slip factor of the drive wheels is performed, and the process is terminated.

The drive force reduction control is performed by the traction controller 1 by outputting a drive force reduction signal to the engine controller 2. In response to this drive force reduction signal, the engine controller 2 controls the fuel injection timing of the fuel injection valve 14 so that the combustion of the engine 4 is uniform combustion, and the output of the engine 4 is reduced by any of the above-mentioned methods.

On the other hand when in the step S1 it has been determined that the drive wheels are not slipping, the routine proceeds to a step S1A.

In the step S1A, the traction controller 1 stops the drive force reduction control and the process proceeds to a step 5A.

As in the case of the determination of step S2, it is determined in the step S5 whether the engine 4 is running in the uniform combustion region or the stratified combustion region.

When the engine 4 is running in the stratified combustion region, it is determined in a step S6 whether or not the recovery timer value RT is zero. In all cases except when it is zero, the recovery timer value RT is decreased by the equation RT=RT−1 in the step S7, and the routine proceeds to a step S8.

When it was determined in step S5 that the engine 4 is not in the stratified combustion region, the routine jumps the steps S6 and S7, and proceeds directly to the step S8.

In the step S8, a signal commanding uniform combustion is output to the engine controller 2, and the process is terminated.

When it was determined in the step S6 that the recovery timer value RT is zero, a signal commanding stratified combustion is output to the engine controller 2 in the step S9, and the process is terminated.

Due to the above process, when for example the engine 4 is running in the stratified combustion region when drive force reduction control has terminated, stratified combustion is not performed immediately, but is performed after having performed uniform combustion with an air-fuel mixture having the stoichiometric air-fuel ratio until the time specified by the recovery timer value RT has elapsed. Therefore, the engine combustion state is protected from the instability which would occur due to a shift to stratified combustion immediately after the termination of drive force reduction control. Drive force reduction control is thus terminated while maintaining a stable running state of the engine 4.

In particular, as the temperature of the engine 4 falls due to drive force reduction control, misfiring easily occurs when stratified combustion is performed immediately after ending drive force reduction control, but by forcibly performing uniform combustion until a predetermined time has elapsed after the termination of drive force reduction control, this problem is eliminated.

The corresponding structures, materials, acts, and equivalents of all means plus function elements in the claims below are intended to include any structure, material, or acts for performing the functions in combination with other claimed elements as specifically claimed. The embodiments of this invention in which an exclusive property or privilege is claimed are defined as follows:

What is claimed is:

1. A drive force controller for a vehicle, said vehicle being provided with a drive wheel and an engine for driving said drive wheel, said engine comprising a combustion chamber for burning air-fuel mixture, said controller comprising:

a sensor for detecting a slip of the drive wheel, a sensor for detecting a running condition of said engine, and a microprocessor programmed to:

control said engine to cause reduction of an engine output according to the slip, control said engine to selectively perform uniform combustion wherein an air-fuel mixture uniformly spread in said combustion chamber is burnt and stratified combustion wherein an air-fuel mixture converged to a part of said combustion chamber is burnt, according to the running condition, and prevent said engine from performing stratified combustion for a predetermined time after said reduction of the engine output has terminated.

2. A drive force controller of as defined in claim 1, wherein said microprocessor is further programmed to control said engine to perform the uniform combustion while the output of the engine is being reduced.

3. A drive force controller as defined in claim 1, wherein said running condition detecting sensor comprises a sensor for detecting a load of said engine, and said microprocessor is further programmed to shorten said predetermined time the larger said load.

4. A drive force controller as defined in claim 1, wherein said running condition detecting sensor comprises a sensor for detecting a rotation speed of said engine, and said microprocessor is further programmed to shorten said predetermined time the higher said rotation speed.

5. A drive force controller as defined in claim 1, wherein said running condition detecting sensor comprises a sensor for detecting a temperature of said engine, and said microprocessor is further programmed to shorten said predetermined time the lower said temperature.

6. A drive force controller as defined in claim 5, wherein said microprocessor is further programmed to set said predetermined time to infinity when said temperature is lower than a predetermined temperature.

7. A drive force controller as defined in claim 1, wherein said microprocessor is further programmed to set a recovery timer value when the slip detecting sensor has detected the slip of the drive wheel, start to reduce said recovery timer value when the slip detecting sensor has come to detects no slip of the drive wheel and determine that the predetermined time has elapsed when said recovery timer value becomes zero.

8. A drive force controller for a vehicle, said vehicle being provided with a drive wheel and an engine for driving said drive wheel, said engine comprising a combustion chamber for burning air-fuel mixture, said controller comprising:

means for detecting a slip of the drive wheel, means for detecting a running condition of said engine, means for controlling said engine to cause reduction an engine output according to the slip, means for controlling said engine to selectively perform uniform combustion wherein an air-fuel mixture uniformly spread in said combustion chamber is burnt and stratified combustion wherein an air-fuel mixture converged to a part of said combustion chamber is burnt, according to the running condition, and means for preventing said engine from performing stratified combustion for a predetermined time after said reduction of the engine output has terminated.

* * * * *